May 3, 1966  M. I. ROSENBERG  3,249,098
ELECTRICAL GOVERNOR SYSTEM
Filed Dec. 2, 1963  3 Sheets-Sheet 2

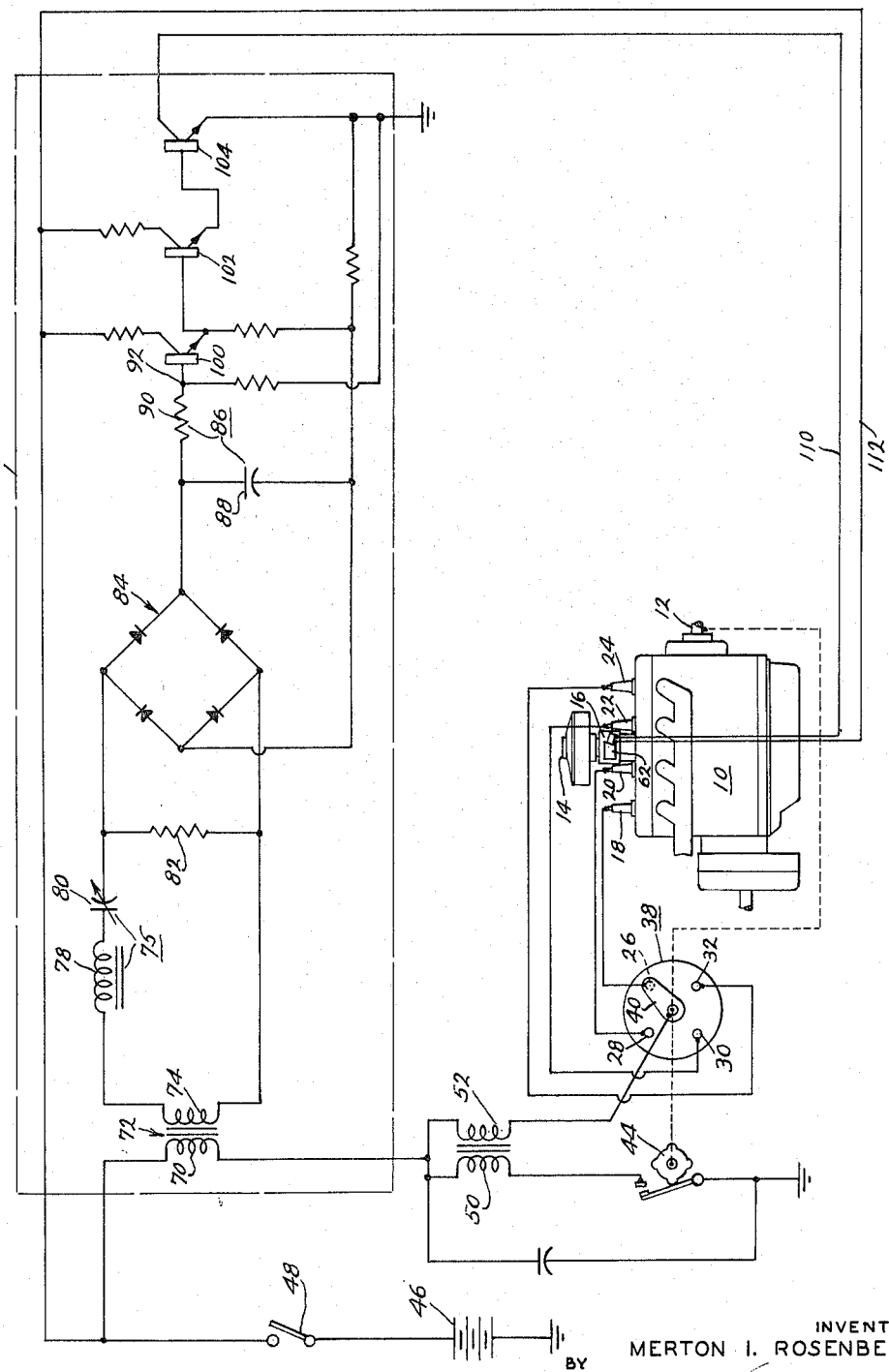

INVENTOR:
MERTON I. ROSENBERG
BY Howson & Howson
ATTYS.

May 3, 1966   M. I. ROSENBERG   3,249,098
ELECTRICAL GOVERNOR SYSTEM
Filed Dec. 2, 1963   3 Sheets-Sheet 3

INVENTOR:
MERTON I. ROSENBERG
BY Howson & Howson
ATTYS.

United States Patent Office 3,249,098
Patented May 3, 1966

3,249,098
ELECTRICAL GOVERNOR SYSTEM
Merton I. Rosenberg, Springfield, Mass., assignor to American Bosch Arma Corporation, Springfield, Mass., a corporation of New York
Filed Dec. 2, 1963, Ser. No. 327,406
7 Claims. (Cl. 123—102)

This invention relates to governor apparatus suitable for automatically controlling the speed of an engine— for example, to maintain it at a fixed predetermined value, to maintain it at a controllably-variable value, or to limit the speed to a fixed maximum value while permitting it to vary below that maximum value. More particularly, the invention relates to a new and useful electrical engine-speed governor.

There are many well-known applications in which it is desirable to govern the speed of an engine, such as a gasoline engine, a gaseous fuel engine, or a diesel engine. In some instances it is desired merely to provide a limitation on the maximum speed which can be attained by the engine, while permitting normal variations below that speed, and arrangement suitable for this purpose will be referred to hereinafter as "over-speed governors." In other case it is desired to control the engine so that it always runs at a single, predetermined, speed except when starting or stopping, and arrangements for accomplishing this will be referred to hereinafter as "constant speed governors." In still other cases it is desired automatically to control the engine so that it operates at a controllable speed, which speed can be varied by an operator, or otherwise, as desired, the speed however being substantially unaffected by other factors such as load variations; apparatus suitable for the latter type of device will be referred to hereinafter as a "variable speed governor."

While various mechanical arrangements for accomplishing such governing have been proposed and utilized in the past, it has been recognized that in certain applications it is advantageous to replace all, or at least some, of the mechanical elements of such a system with electrical apparatus, and variety of such electrical governors have also been proposed. The governor system which is the subject of the present invention is of the latter type, and is believed to provide advantages over previously-known electrical governors in respect of one or more of the following features—namely, simplicity, compactness, inexpensiveness, compatability with high-quality ignition, adaptability to variable-speed governing, closeness of regulation of speed despite substantial load changes, and broad applicability to different types of engines and different types of governing.

Accordingly it is an object of the invention to provide a new and useful electrical engine-speed governor.

A further object is to provide such a governor which is simple, compact and inexpensive.

It is another object to provide such a governor in which close regulation of engine speed is provided despite substantial load variations.

It is another object to provide such a system which is readily adaptable to variable-speed governing.

Still another object is to provide an electrical engine-speed governor which is applicable to use with a large variety of engine types and for a variety of governing purposes.

In accordance with the invention, the above and other objects are achieved by an arrangement in which electrical signals are generated which contain variations recurrent at a rate varying with the speed of the engine to be governed, and in which these signals are supplied to reactive means, such as a series-resonant circuit, to produce output signals which contain variations recurrent at said rate and having magnitudes which vary with said rate over a predetermined range of rates. The output signals from the reactive means are supplied to rectifying and filtering means to derive therefrom a rectified and smoothed electrical control signal having a level which varies with said rate over said range, but from which variations at said rate are substantially eliminated. The level of the latter control signal then varies in accordance with changes in engine speed. These signals are supplied to a D.C. amplifier to produce an output actuating signal which varies in accordance with the level of the control signal at the amplifier input, but which is of higher power. Preferably the amplifier has an input threshold level below which its output is substantially non-responsive to its input, and a silicon-transistor amplifier is preferably used for this purpose as described in detail hereinafter. The high-power actuating signal thus produced is supplied to an electromechanical actuating means for automatically adjusting an engine-speed control device. Typically the engine-speed control device is a butterfly valve in the carburetor of an engine, while the actuating means may be a solenoid of linear or rotary type; in the case of an over-speed governor, the engine-speed control is essentially an over-ride stop having an adjustable position which may be used to prevent the carburetor valve from turning past a position determined by the position of the over-ride stop. The polarity of the control signals applied to the actuating means is such that the engine-speed control device is adjusted in a direction to oppose increases in the engine speed beyond a predetermined speed. In the case of the constant-speed or variable-speed governor, the governing action is continuously asserted; while in the case of the over-speed governor, control is exerted only when the engine tends to exceed the maximum speed set by the governor.

Preferably the above-mentioned means for generating electrical signals containing variations recurrent at a rate varying with the speed of the engine comprises the series combination of an inductor and capacitor, either of which may be made variable in value to permit controlled variation of the speed at which governing action takes place. Such variation of the inductive or capacitive element may be used to set the speed of a constant-speed governed engine, to adjust the speed at which an over-speed governor comes into operation, or to provide the variable control required for variable-speed governing.

Preferably also the engine-speed control device is spring-biased in a given direction and urged by the actuating means in the opposite direction, the spring characteristics being chosen to provide the desired restoring force on the engine-speed control and to be compatible with the amount of power supplied to the actuating means.

These and other objects and features of the invention will be more readily comprehended by a consideration of the following detailed description, taken in connection with the accompanying drawings, in which:

FIGURE 1 is a schematic representation illustrating one embodiment of the invention as it may be used in one particular application thereof;

FIGURE 2b is a section taken on line 2b—2b of FIGURE 2a;

Figure 3:
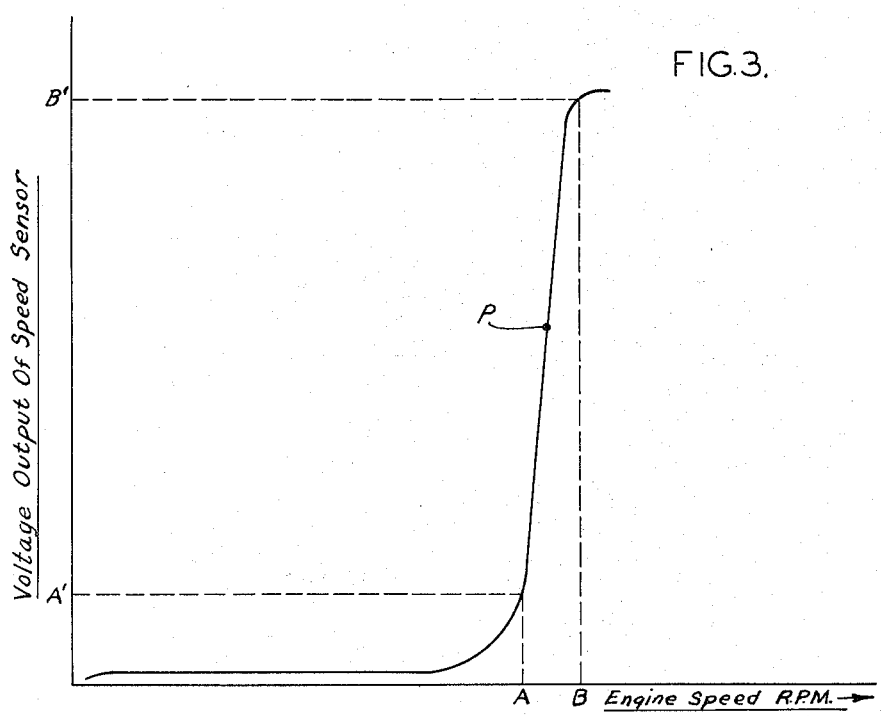
Figure 4:
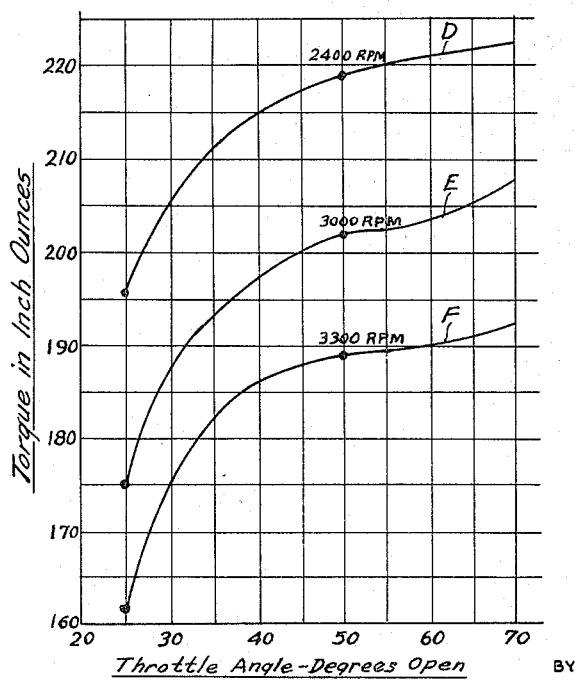

FIGURE 3 is a graphical representation illustrating a typical relationship between engine speed and the output of a speed sensor for deriving signals of a magnitude dependent upon engine speed; and FIGURE 4 is a graphical illustration illustrating typical relationships between the angle of the throttle of an engine controlled by my novel governor and the load on the engine, for three different governor speeds.

Referring now to the representative embodiment of the invention shown in FIGURE 1, there is shown therein an engine 10 for turning a motor shaft 12, the engine being shown as the ordinary gasoline-burning type having four cylinders, merely by way of example. In this instance, air is drawn into the cylinders through air inlet 14 by way of a conventional carburetor 16, the speed of the engine being controllable by means of an engine-speed control device which typically comprises a butterfly valve in the carburetor and rotatable by means of a valve shaft.

In the present example the engine is shown as a four-cylinder engine having four spark plugs 18, 20, 22 and 24 supplied in a predetermined sequence with ignition sparks from the four fixed contacts 26, 28, 30 and 32, respectively, on the distributor 38 as the distributor arm 40 rotates in the usual way. Distributor arm 40 is mechanically coupled, directly or through appropriate gearing, with the shaft 12 of the engine and with the breaker assembly 44 which opens and closes the ignition circuit to generate ignition sparks in the conventional manner. Thus the switch element of breaker assembly 44 is connected in common series circuit with a battery 46, manual ignition switch 48, and ignition transformer primary 50, the secondary 52 of the ignition transformer being connected to distributor arm 40.

The portion of the system thus far described comprises a conventional engine and ignition system therefor.

In accordance with the invention in this embodiment, there is provided an electrical governor circuit 60 which actuates an actuating mechanism 62, in this case mounted on the carburetor, so as to control the engine speed by adjustment of the carburetor valve shaft. Circuit 60 includes engine-speed sensing apparatus for generating electrical signals containing variations recurrent at a rate varying with the speed of the engine 10. While in some systems such as those utilizing diesel engines this function may be supplied by apparatus using pickup coils situated adjacent one or more magnets rotating with the engine shaft, in the present example this is conveniently and efficiently accomplished by inserting in series in the ignition circuit a low-impedance primary winding 70 of a transformer 72 having a secondary winding 74, the transformer preferably being designed to have a sufficiently extended high-frequency response to preserve the sharpness of pulses of current through its primary 70. With the ignition switch 48 closed, each time the breaker assembly 44 opens the series ignition circuit a strong, sharp pulse is produced in the pickup or sensing coil comprising the primary 70 of transformer 72 and a corresponding pulse is induced in the secondary 74 thereof. The voltage across the secondary 74 therefore contains variations recurrent four times for each rotation of the distributor shaft 40 and, since the distributor shaft 40 rotates with the engine shaft 12, the voltage variations across transformer secondary 74 are recurrent at a rate proportional to the engine speed.

The voltage variations produced across the secondary of transformer 72 are then applied to a reactive element 75 the output of which contains variations which are recurrent at the rate of recurrence of the variations across transformer secondary 74 but which have amplitudes which vary with the rate of recurrence of such variations. In the present example this reactive element comprises the series-resonant circuit comprising inductor 78 and capacitor 80, connected in series with each other and with hte resistor 82 across the winding 74. The magnitude of the voltage variations across resistor 82 therefore varies with engine speed, and the series-resonant circuit therefore serves as a speed sensor.

More particularly, FIGURE 3 is a graph illustrating a typical relationship between the magnitude of the voltage variations at the output of the series-resonant circuit and the engine speed. As shown therein, for low engine speeds the voltage remains very low due to the high reactance of capacitor 80, but as the engine speed is increased towards a speed producing a recurrence rate near the series-resonant frequency of inductor 78 and capacitor 80, the voltage begings to rise at first slowly and then very rapidly toward a peak at a series-resonance frequency just above the engine speed B. Between the engine speeds indicated at A and B, the voltage output of the speed sensor rises rapidly and substantially linearly with increasing engine speed. It will be understood that the voltage across resistor 82 is fluctuating in nature, and that the voltage referred to in the graph of FIGURE 3 is the magnitude of these fluctuations.

The voltage fluctuations across resistor 82 are then supplied to a rectifying and filtering arrangement comprising the bridge rectifier 84 and the resistance-capacitance filter 86 made up of shunt capacitor 88 and series resistor 90. The rectifier and filter operate in conventional manner to rectify and smooth the variations across resistor 82 and to produce at point 92 a voltage which may be considered as a D.C. control voltage, although its level varies with engine speed within the range AB of engine speeds in FIGURE 3. FIGURE 3 is therefore also applicable to the output control voltage level produced at point 92, when the ordinates thereof are interpreted as the D.C. level of the voltage at this point.

The resonant frequency of the series-resonant combination 78, 80 may be made variable by making one or more of the elements 78, 80 variable in value, thereby to permit variation of the engine speeds at which the points AB occur.

The voltage at point 92, which ultimately controls the actuating mechanism for the carburetor of engine 10, is supplied to the input of a D.C. amplifier which in this example comprises a three-stage direct-coupled transistor amplifier, preferably utilizing silicon transistors. In this case there are employed three NPN transistors 100, 102, and 104. Normally all three of the transistors are substantially cut off, and remain so until the level of the control voltage at point 92 rises sufficiently to turn on transistor 100, which in turn turns on transistors 102 and 104 to an extent determined by the level of the control voltage. Supply voltage for the amplifier is provided from battery 46, and the current output of the amplifier between the collector and emitter of transistor 104 thereof is connected to the input terminals of the actuator mechanism 62.

Figure 2A:
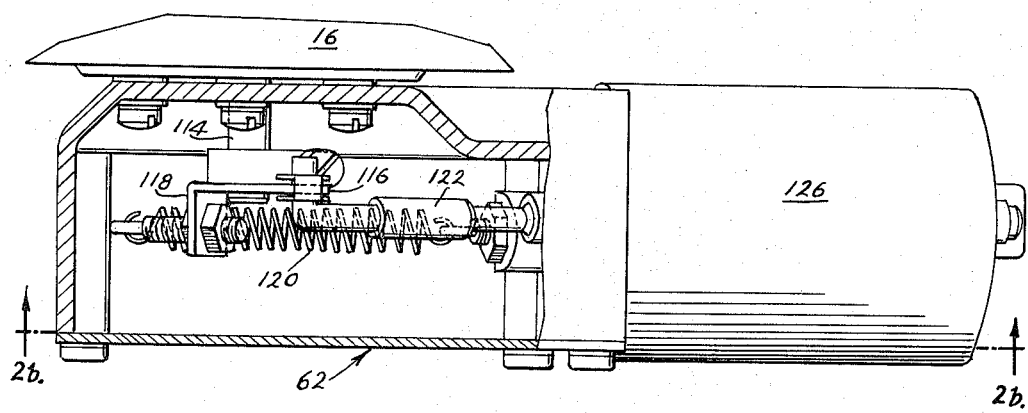
FIGURE 2a is a top view, partly in section, of one preferred form of actuating means for controlling the engine-speed control device.
Figure 2B:
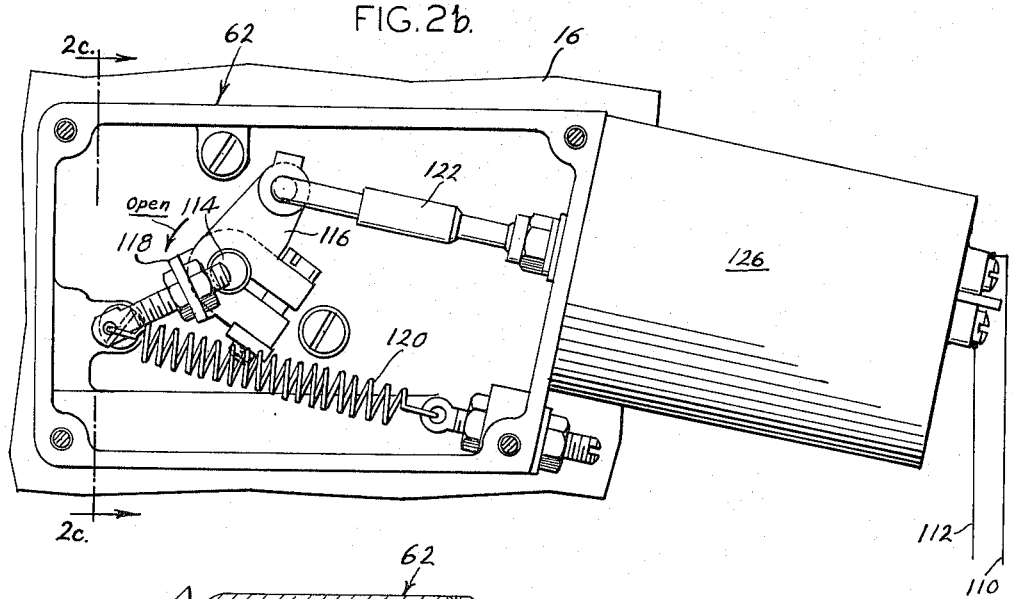
Figure 2C:
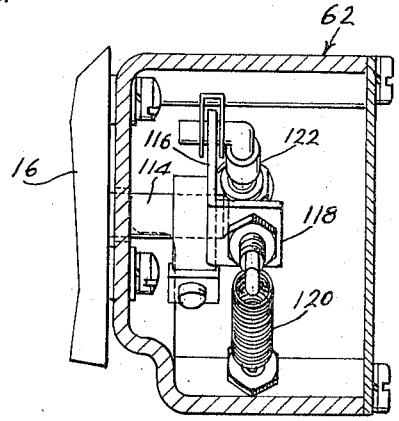
FIGURE 2c is a section taken on line 2c—2c of FIGURE 2b.

One typical form of actuator mechanism 62 and its connection to the carburetor control shaft is illustrated in the three views of FIGURES 2a, 2b and 2c. It is the function of this mechanism to respond to increases in current through the lead wires 110 and 112 above a predetermined minimum threshold level to produce a corresponding increasing rotation of carburetor shaft 114 of carburetor 16. Carburetor shaft 114 is connected to two radially-extending arms 116 and 118, arm 118 being urged counter-clockwise by spring 120 and arm 116 being urged clockwise by solenoid arm 122 when sufficient current is applied by way of leads 110 and 112. As shown, the actuator mechanism may be mounted directly on the side of the carburetor. The electromechanical actuating device 126 is typically a solenoid, in this case a linear solenoid although rotary solenoids or other types of devices may be used instead. Typically solenoid 126 comprises a cylindrical solenoid winding surrounding a rod of magnetic material so that as the current through the coil, produced by way of leads 110 and 112, increases the rod is drawn further into the solenoid winding. Such devices are well known in the art and hence need not be described in detail.

Although the invention is applicable to systems in which the carburetor is initially biased closed, in the present example it will be assumed that spring 120 acts in a direction to hold the carburetor valve in its fully-open position in the absence of current to solenoid 126. Spring 120 is chosen to provide a spring bias capable of moving the carburetor shaft sufficiently rapidly when the carburetor valve is to be opened further, while permitting solenoid 126 to rotate the valve in the opposite direction against the spring bias in response to input electrical current thereto. The specific arrangement shown is suitable for variable speed governing or constant speed governing. It will be understood that for over-speed governing a similar rotating-arm assembly may be utilized which, however, instead of continuously actuating and driving the carburetor valve merely provides an angularly-variable stop which limits the maximum angular rotation of the carburetor valve by bearing against a corresponding stop on the carburetor shaft.

In operation of the specific system shown, with switch 48 closed the motor is started by any conventional means, at which time the carburetor valve is full open. The carburetor may be provided with a manually-operated choke valve so that the engine may be readily started under these conditions. Operation of breaker assembly 44 produces a pulse in transformer primary winding 70 each time one of the spark plugs of engine 10 fires, and produces a corresponding pulse in the secondary 74 of the transformer 72. When the engine is first starting up these pulses are recurrent at a low rate well below the frequency of substantial response of the series-resonant circuit comprising inductor 78 and capacitor 80, corresponding to the region in the graph of FIGURE 3 lying below the point A. The signals passing through rectifier 84 and filter 86 therefore produce a low level of control voltage at point 92, which is connected to the base of transistor 100. Even though the base of transistor 100 is D.C.-connected to the emitter thereof without intervening biasing means, transistor 100 remains substantially cut off for low engine speeds below that represented by point A in FIGURE 3 since it is characteristic of the silicon transistor preferably employed for this purpose that it does not become substantially conductive until its base voltage has become positive with respect to its emitter voltage by a substantial amount corresponding to the voltage level A' in FIGURE 3. However, as the engine continues to pick up speed with open throttle the rate of recurrence of the pulses supplied to the frequency-sensing series resonant circuit increases into the region above point A of FIGURE 3, at which point the control voltage at the base of transistor 100 becomes sufficient to start appreciable conduction in transistor 100 and to pass appreciable current through the input leads to the actuating mechanism 62. At this point the solenoid arm 122 of FIGURE 2b exerts a pull on arm 116 to move the carburetor valve toward the closed position against the spring bias. As the rate of recurrence of the pulses increases in the region between A and B of FIGURE 3, the correspondingly-increasing output current of the amplifier causes solenoid arm 122 to move further, thus moving the throttle further toward the closed position.

This operation continues until, at some point within the range AB of FIGURE 3, the throttle has been closed sufficiently to limit the engine speed to a speed for which the throttle position is held substantially constant. This may, for example, occur at point P in FIGURE 3, preferably near the center of the rapidly-rising, substantially-linear, portion of the characteristic shown therein. If now the engine speed should tend to increase further, for example due to a decrease in the load on the engine, this tendency is opposed by a corresponding increase in current through the actuating mechanism which closes the throttle somewhat further to oppose the tendency toward increased speed. If, on the other hand, the engine speed tends to decrease, for example due to an increase in load on the engine, the current supplied to the actuating mechanism decreases slightly, permitting the spring 120 of FIGURE 2b to move the carburetor slightly toward open position, thus again maintaining the speed substantially constant.

The engine speed at which the point of stabilization P occurs can be adjusted to any desired value by adjusting the resonant frequency of the series-resonant circuit 75, for example by adjusting the capacity of capacitor 80, a lower series-resonant frequency producing stabilization at a lower engine speed. The position of P within the operating range AB generally varies considerably with load during the control action, and may for example vary substantially completely over the operating range of the graph between the points A and B. The angular position of the throttle changes correspondingly. Thus, by way of example only, FIGURE 4 illustrates the typical nature of variation of throttle angle with engine load for the case of a 292 cubic inch, V-8 engine using propane gas as the fuel. Lines D, E and F in the graph illustrate this characteristic for examples in which the engine speed is stabilized, respectively, at speeds of about 2400, 3000 and 3300 r.p.m. respectively. The variation in throttle angle from about 25° to 70° open for each case illustrates a typical range of throttle angle variation with load on the engine. Typically the engine speed is controlled by the system described above to within one or two percent of the operating speed.

In some instances, for example in connection with diesel engines, it may be convenient to replace the transformer arrangement 72 for sensing the rate of recurrence of pulses with a pickup coil located adjacent magnetic teeth on a rotor geared to the engine shaft. In some instances it may also be convenient to provide a variable inductance 78, as by providing for adjustable inward and outward motion of a magnetic core in an inductive coil. Other types of amplifiers may also be utilized; for example a single-stage amplifier may be used where the power requirements can be provided thereby, and it is also possible to utilize germanium transistors in place of silicon transistors, although silicon transistors are preferred for the reasons indicated above and for their superior high temperature characteristics.

Although the invention has been described with particular reference to specific embodiments thereof, it will be understood that it may be embodied in any of a large variety of forms without departing from the spirit and scope of the invention as defined by the appended claims.

I claim:
1. Electrical governor apparatus for an engine, comprising:
    means for generating electrical signals containing variations recurrent at a rate varying with the speed of an engine to be governed;
    reactive means supplied with said signals and responsive thereto to produce corresponding electrical output signals containing variations which are recurrent at said rate and which have a magnitude varying with said rate over a predetermined range of said rates;
    rectifying and filtering means supplied with said output signals for deriving therefrom a rectified and smoothed electrical control signal having a level varying with said rate over said range but from which variations at said rate are substantially eliminated;
    a D.C. amplifier supplied with said control signal and responsive thereto to produce an actuating signal varying in accordance with the level of said control signal but of higher power;
    an engine-speed control device for said engine having a shaft member rotatable to vary said engine speed;
    means connected to said shaft member and radially extending therefrom for turning said shaft member;
    spring means connected to said radially-extending means for urging said shaft member in one rotary sense toward one extreme position thereof; and a solenoid device having an armature connected to said radially-extending means and supplied with said actuating signal for urging said shaft member in a rotary sense opposite to said one rotary sense and toward its opposite extreme position in proportion to the strength of said actuating signal, to oppose changes in said engine speed above a predetermined speed.

2. Apparatus in accordance with claim 1, in which said spring means is connected to urge said shaft member in the direction to speed up said motor.

3. Apparatus in accordance with claim 1, in which said means for generating electrical signals comprises an ignition system including a circuit for supplying ignition pulses for said engine and a voltage step-up transformer having a low-impedance primary winding in series in said ignition circuit and having a secondary winding connected to the input terminals of said reactive means.

4. Apparatus in accordance with claim 1, in which said reactive means comprises a series-resonant circuit in series between said means for generating electrical signals and said rectifying and filtering means.

5. Apparatus in accordance with claim 4, in which said series-resonant circuit comprises capacitive means in series with inductive means, at least one of said capacitive and inductive means being controllably variable in value.

6. Apparatus in accordance with claim 1, in which said D.C. amplifier is characterized by a threshold level of input signal below which the output signal thereof does not vary appreciably with changes in input voltage.

7. Apparatus in accordance with claim 6, in which said amplifier comprises at least one common-emitter silicon transistor amplifying stage.

References Cited by the Examiner

UNITED STATES PATENTS

| | | | |
|---|---|---|---|
| 1,390,510 | 9/1921 | Douglas et al. | 123—102 |
| 2,478,279 | 8/1949 | Kochenberger. | |
| 2,637,014 | 4/1953 | Stallard. | |
| 2,637,015 | 4/1953 | Franklin. | |
| 3,036,562 | 5/1962 | Scott | 123—102 |
| 3,049,110 | 8/1962 | Kerr | 123—102 |

FOREIGN PATENTS 742,166  12/1955  Great Britain.

MARK NEWMAN, *Primary Examiner.*

LAURENCE M. GOODRIDGE, *Examiner.*